Figure 13A:
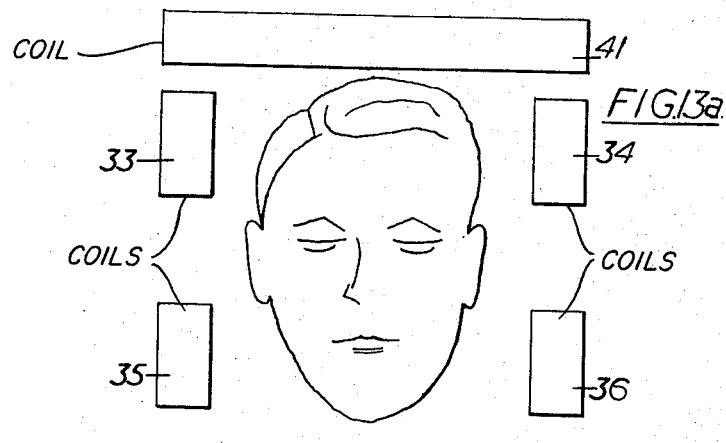

Dec. 19, 1967  E. H. FREI ETAL  3,358,676
MAGNETIC PROPULSION OF DIAGNOSTIC OR THERAPEUTIC
ELEMENTS THROUGH THE BODY DUCTS OF
ANIMAL OR HUMAN PATIENTS
Filed Nov. 15, 1963  9 Sheets-Sheet 1
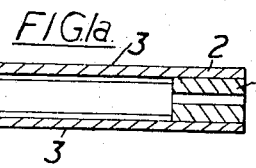
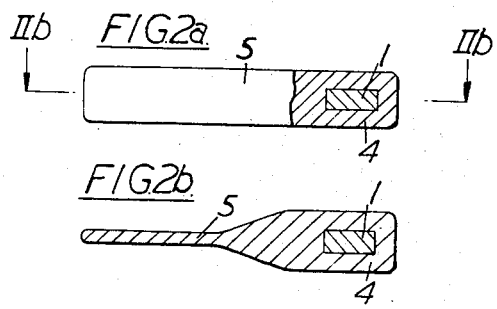
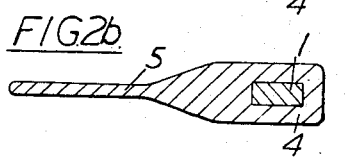
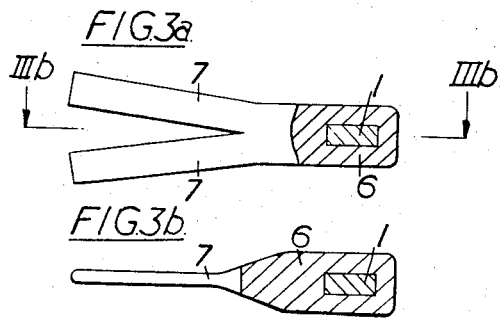
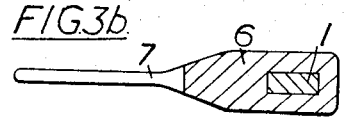
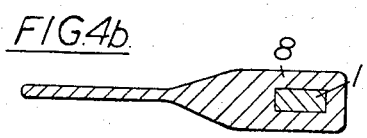
INVENTORS
EPHRAIM H. FREI
SAUL LEIBINZOHN
BY
OSTROLENK, FABER, GERB & SOFFEN
ATTORNEYS Dec. 19, 1967  E. H. FREI ETAL  3,358,676
MAGNETIC PROPULSION OF DIAGNOSTIC OR THERAPEUTIC
ELEMENTS THROUGH THE BODY DUCTS OF
ANIMAL OR HUMAN PATIENTS
Filed Nov. 15, 1963  9 Sheets-Sheet 2
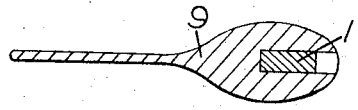
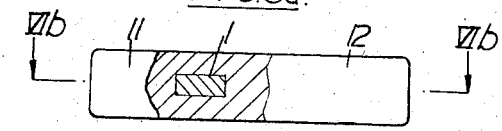
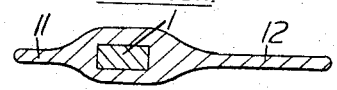
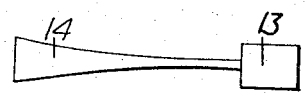
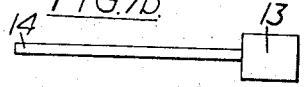
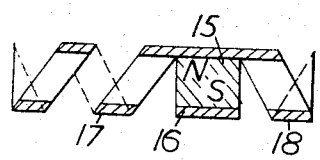
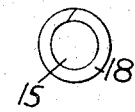
Inventors
EPHRAIM H. FREI
SAUL LEIBINZOHN
By
OSTROLENK, FABER, GERB & SOFFEN
Attorneys Dec. 19, 1967 E. H. FREI ET AL 3,358,676
MAGNETIC PROPULSION OF DIAGNOSTIC OR THERAPEUTIC
ELEMENTS THROUGH THE BODY DUCTS OF
ANIMAL OR HUMAN PATIENTS
Filed Nov. 15, 1963 9 Sheets-Sheet 3
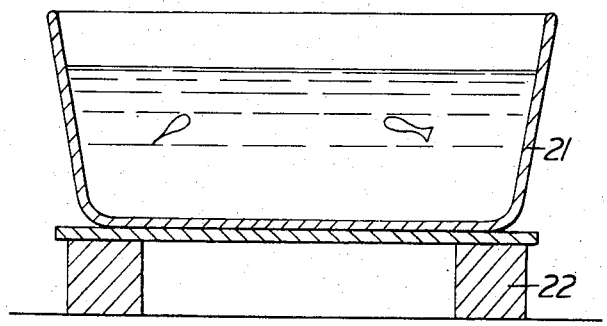
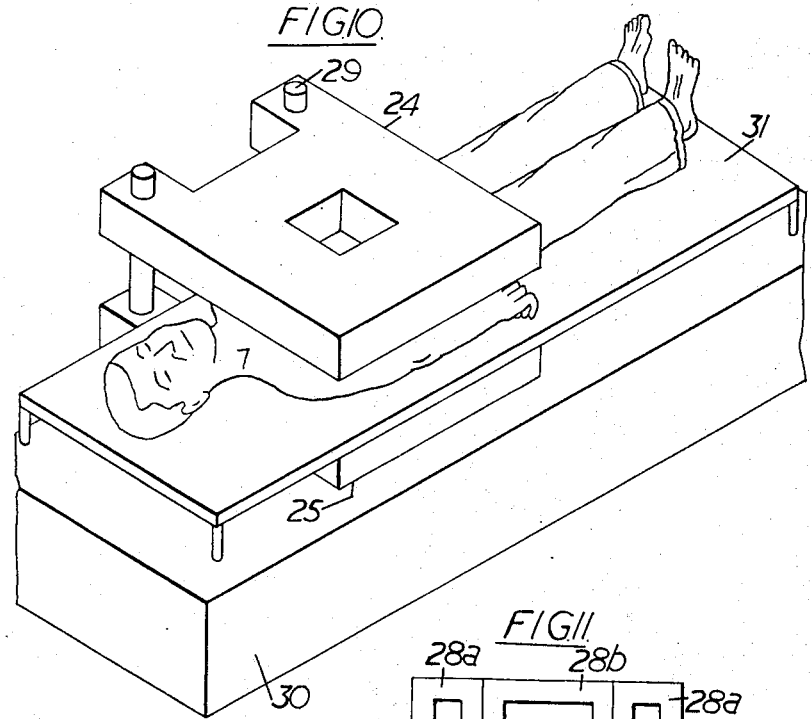
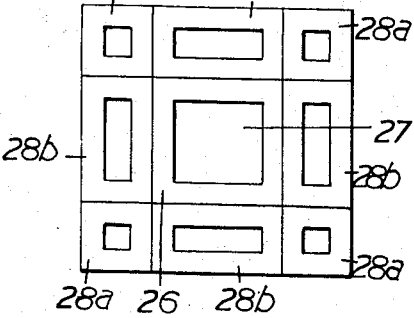
INVENTORS
EPHRAIM H. FREI
SAUL LEIBINZOHN
BY
OSTROLENK, FABER, GERB & SOFFEN
ATTORNEYS

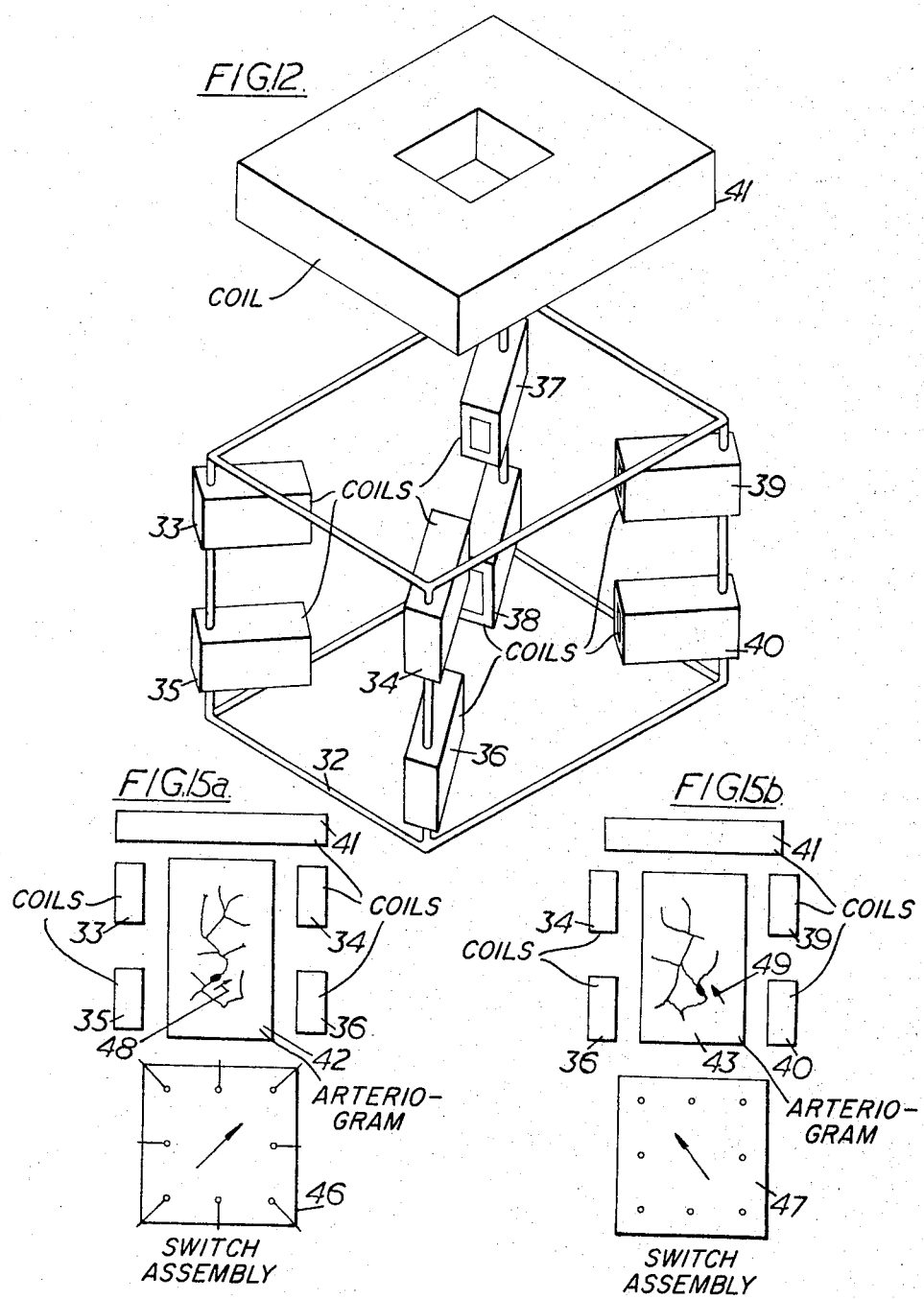

INVENTORS
EPHRAIM H. FREI
SAUL LEIBINZOHN
BY
OSTROLENK, FABER, GERB & SOFFEN
ATTORNEYS

Dec. 19, 1967   E. H. FREI ETAL   3,358,676
MAGNETIC PROPULSION OF DIAGNOSTIC OR THERAPEUTIC
ELEMENTS THROUGH THE BODY DUCTS OF
ANIMAL OR HUMAN PATIENTS
Filed Nov. 15, 1963   9 Sheets-Sheet 6
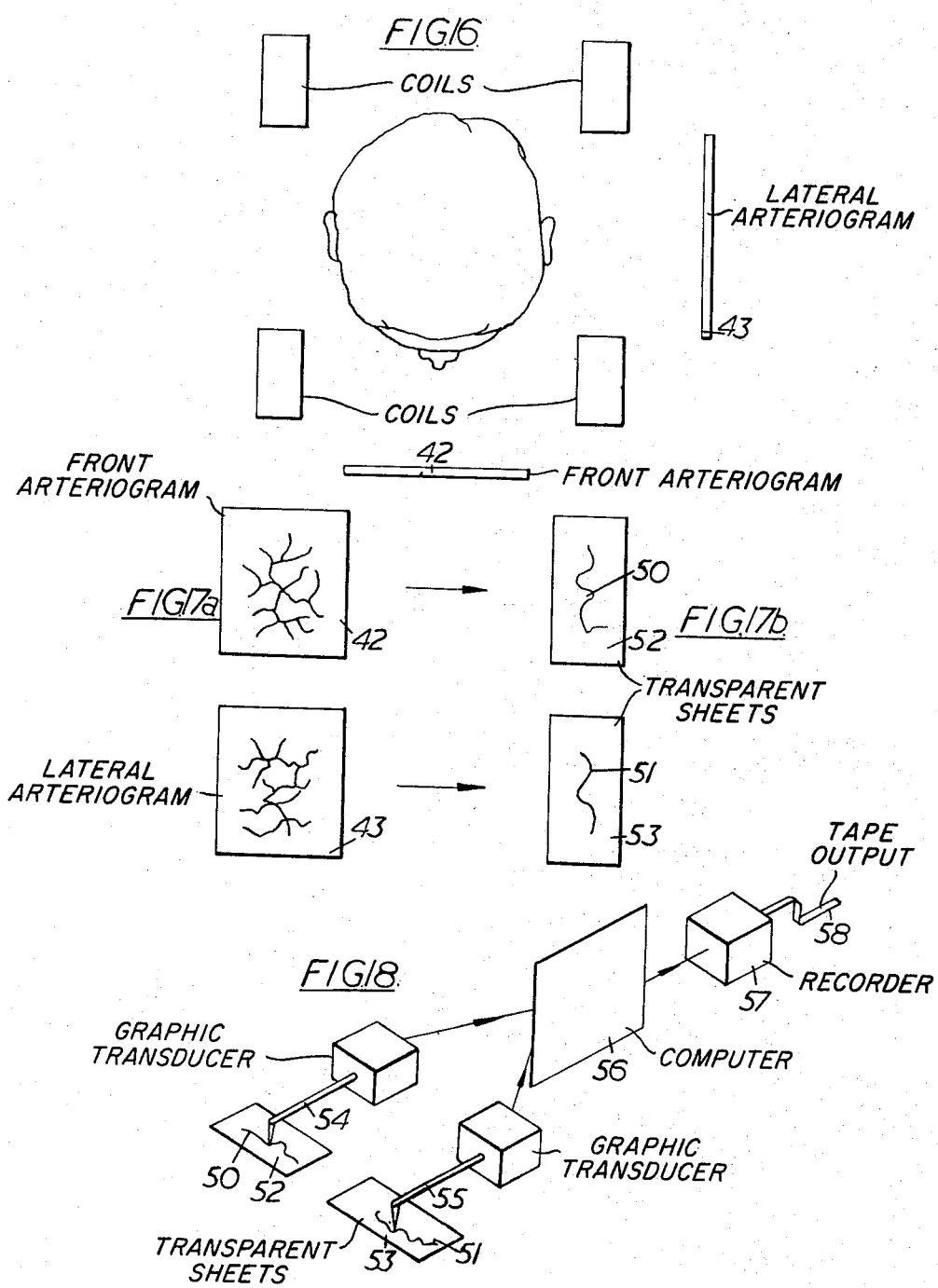
INVENTORS
EPHRAIM H. FREI
SAUL LEIBINZOHN
BY
OSTROLENK, FABER, GERB & SOFFEN
ATTORNEYS

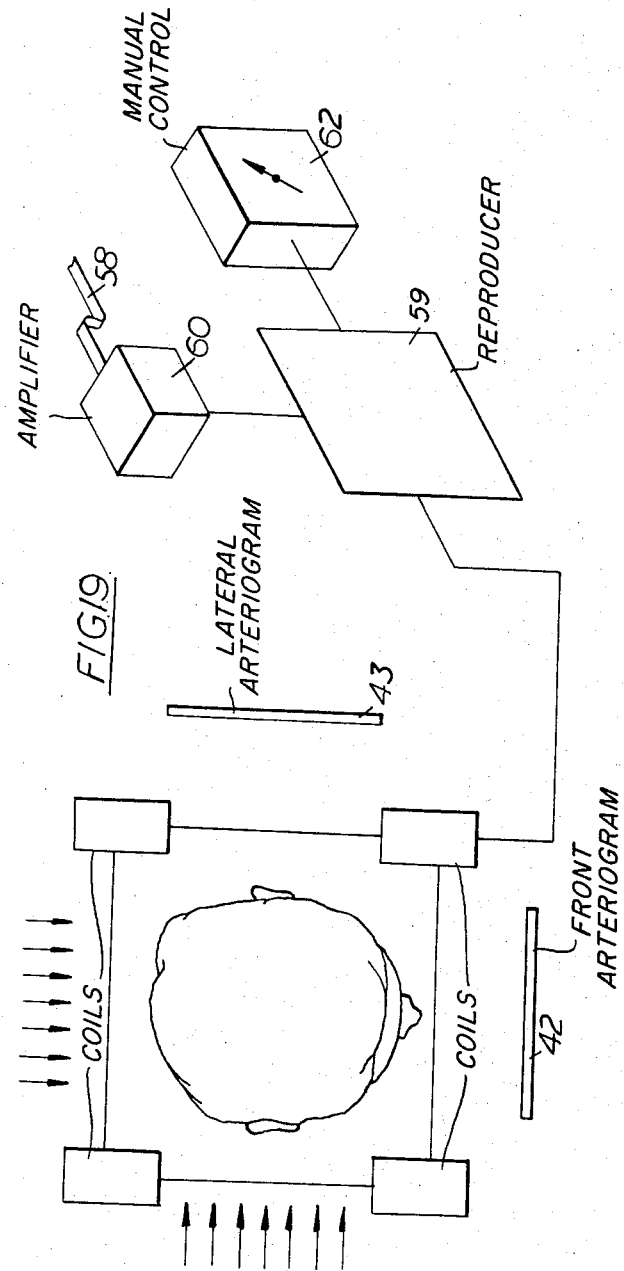

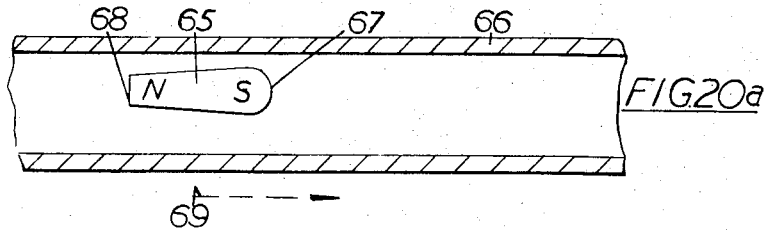
FIG 20a
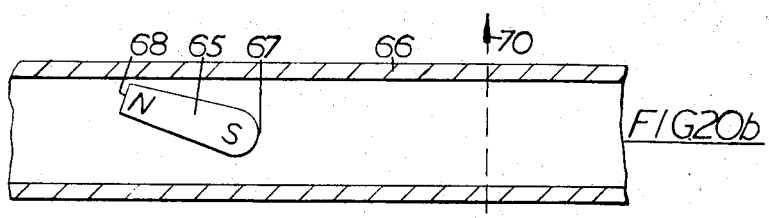
FIG 20b
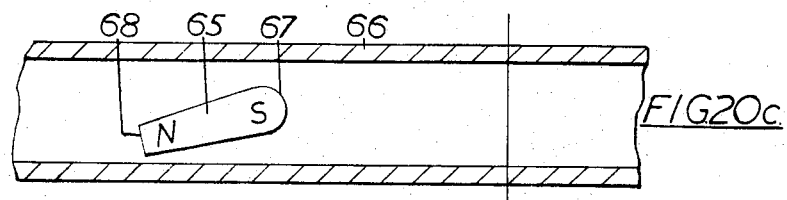
FIG 20c
FIG 25
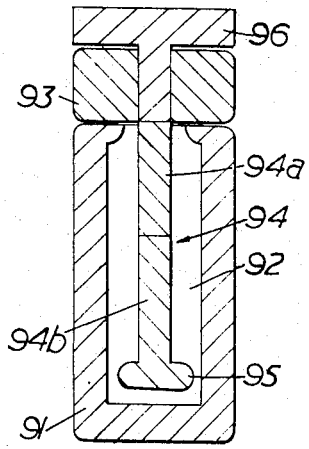
INVENTORS
EPHRAIM H. FREI
SAUL LEIBINZOHN
BY
OSTROLENK, FABER, GERB & SOFFEN
ATTORNEYS

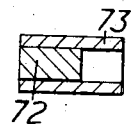
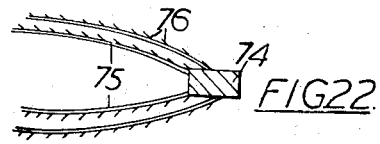
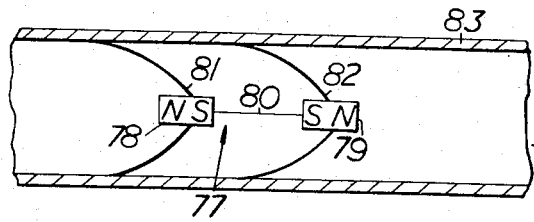
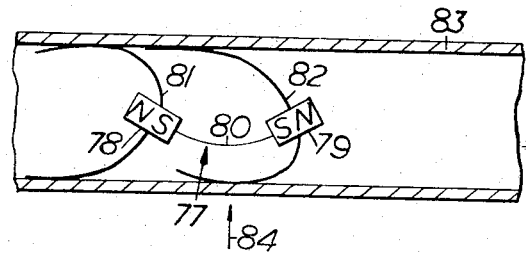
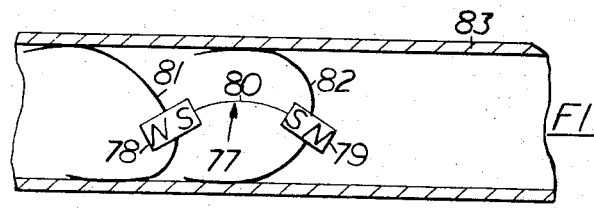
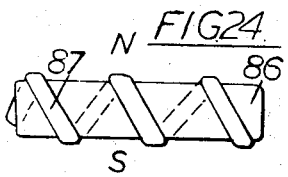

United States Patent Office 3,358,676
Patented Dec. 19, 1967

3,358,676
MAGNETIC PROPULSION OF DIAGNOSTIC OR THERAPEUTIC ELEMENTS THROUGH THE BODY DUCTS OF ANIMAL OR HUMAN PATIENTS
Ephraim Heinrich Frei, Rehovoth, and Saul Leibinzohn, Rishon-Lezion, Israel, assignors to Yeda Research and Development Co., Ltd., Rehovoth, Israel, a company of Israel
Filed Nov. 15, 1963, Ser. No. 324,088
Claims priority, application Great Britain, Nov. 30, 1962, 45,437/62
12 Claims. (Cl. 128—1.3)

This invention relates to the remotely controlled propulsion over short distances, e.g. distances of the order of one meter, of an element which is in contact with a medium between which medium and element or within which medium a frictional resistance to motion of an element exists. The invention is particularly but not exclusively concerned with the propulsion of such an element through a suitable duct of a human being or animal, the element being designed to perform certain required functions upon activation, e.g. to effect the release of drugs at a predetermined position.

It is an object of the present invention to provide new and improved means for the remotely controlled propulsion of an element.

According to one aspect of the present invention, there is provided apparatus for the propulsion of an element which is in contact with a medium between which and the element, or within which a frictional resistance to motion of the element exists comprising at least one magnetic element constituted by, or associated with the element, and means for producing a varying magnetic field adapted to act on the element so as to impart thereto a vibrational or rotational motion, said frictional resistance imparting a longitudinal component to the motion.

In order to ensure that the frictional resistance is effective in imparting the longitudinal component of motion to the element, the element is so shaped as to be radially asymmetrical, i.e. to have no center of symmetry.

Two main cases can be distinguished; one wherein the element is to be propelled through a liquid, and the other wherein the element is to be propelled in contact with a rigid supporting surface such as, for example, the walls of a tube.

In the case where the element is to be propelled through a surrounding liquid, the frictional resistance, referred to above, arises out of the viscosity (i.e. internal friction) of the liquid. The element can be provided with a resilient tail and where a vibrational or rotational motion is imparted to the element the tail performs a flailing motion resulting in the propulsion of the element.

Where, on the other hand, the element is to be propelled in contact with a supporting surface such as, for example, the wall of a tube and, possibly not in a liquid, the required frictional resistance arises out of the successive impacts of the element with the supporting surface resulting out of the vibration of the element. In the case, however, where a rotational motion is imparted to the element, propulsion is effected by associating the element with a screw structure which has continuous contact with the supporting surface.

Whilst the propulsion of the element is effected as indicated above, it may, in some cases, be necessary to guide the propelled element in certain preferred directions. This can be achieved by supplementing the means for producing the varying fields by further means by subjecting the element to a biasing field or fields in the required direction. Means may furthermore be provided for switching these biasing fields into and out of operation as required. In this way the element can be threaded into and out of any of a number of desired paths or conduits such as, for example, body ducts.

The propulsion of the element under the varying magnetic field, resulting as it does in the vibratory or rotatory advance of the element is particularly effective in ensuring this advance along tortuous paths where the possibility of the element becoming stuck is otherwise considerable. Thus the continuing motion imparted to the element results in the element becoming freed for continued advance.

The varying magnetic fields employed may vary in different ways thus, for example, alternating, saw-tooth or pulsed fields may be used.

Under certain circumstances, however, where these possibilities of the element becoming stuck are not so great and the path along which the element is to be advanced is a relatively simple path, a modification of the apparatus referred to above comprises first means for producing a homogeneous unidirectional magnetic field to act on the element so as to determine the direction of advance thereof, and second means for producing a unidirectional magnetic field gradient to act on the element so as to propel the element in said direction, and switching means for independently actuating the first and second means.

Apparatus in accordance with the invention will be described below wherein the controlled propulsion of the element along certain ducts of a human or animal corpus can be effected and observed. Furthermore, examples of elements to be propelled will be described which are particularly useful in releasing substances at predetermined positions in their paths of advance. The advance and guidance of the element along the desired path can be under the direct control of an operator. Alternatively, information concerning the path to be followed by the element can be fed to a computer which produces a program by means of which the advance and guidance of the element can be automatically effected.

Figure 13B:
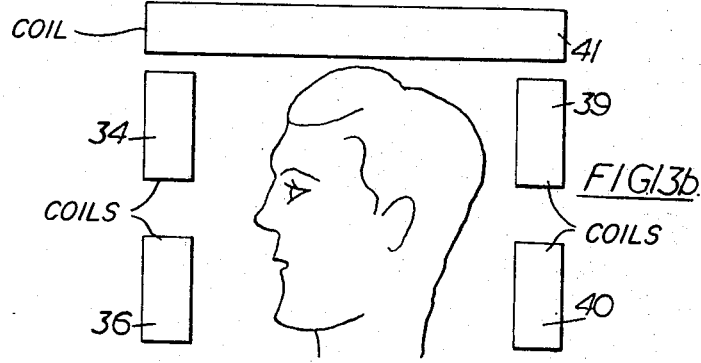
Figure 14:
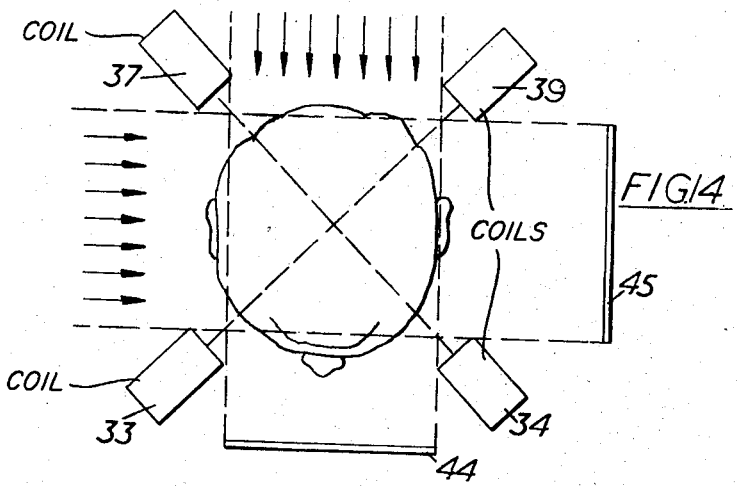

Various embodiments of apparatus and components thereof in accordance with the invention will now be described by way of example and with reference to the accompanying drawings in which:

FIGS. 1a, 1b to 8a, 8b show respective pairs of sectional elevations, taken at right angles to one another of each of 8 bodies suitable for propulsion in a liquid media, FIG. 9 is a schematic representation of the application of the invention to the random propulsion of toy fish in a toy aquarium, FIG. 10 is a schematic perspective view of apparatus in accordance with the invention for the propulsion of a suitable element in the cardio-vascular system of a patient, FIG. 11 is a schematic plan-view of the apparatus shown in FIG. 10 illustrating the layout of the magnetic coils, FIG. 12 is a schematic perspective elevation of a further form of apparatus in accordance with the invention which can be used for examination of the brain arterial system, FIGS. 13a and 13b are front and side elevations, respectively of the apparatus shown in FIG. 12 with the patient's head in position, FIG. 14 is a plan-view from above of the apparatus shown in FIG. 12 with the patient's head in position showing the direction of X-rays for the production of front and lateral arteriographs, FIG. 15a is a front elevation of the apparatus showing the front arteriograph and the position of the element and the corresponding position of a front switching mechanism, FIG. 15b is a lateral elevation showing the lateral arteriograph and the corresponding position of the element and the corresponding position of the lateral switching mechanism, FIG. 16 is a schematic representation from above showing the use of the apparatus shown in FIG. 12 for obtaining front and lateral arteriograms for use in programmed operation, FIG. 17a shows the arteriograms produced, and FIG. 17b shows the desired paths of travel of the element plotted on a transparent medium, FIG. 18 is a schematic representation of equipment employed for transducing the paths shown in FIG. 17b into magnetically recorded control signals, FIG. 19 is a schematic representation illustrating the operation of the apparatus shown in FIG. 12 in directing an element by a predetermined program, FIGS. 20a, 20b and 20c are schematic cross-sections through a tubular member, illustrating the mode of propulsion therethrough of a suitably shaped element under influence of an alternating magnetic field, FIGS. 21 and 22 show sectional elevations of two further forms of elements suitable for propulsion, not necessarily in a liquid, by repeated impacts with a supporting surface, FIGS. 23a, 23b and 23c are schematic cross-sections through a tubular member, illustrating the mode of propulsion therethrough of a further form of element under influence of an alternating magnetic field, FIG. 24 is an elevation of a further form of element which can be propelled under an alternating magnetic field in contact with a supporting surface, and FIG. 25 is a longitudinal cross-section of a magnetic element suitable both for propulsion in accordance with the invention and for releasing a contained substance.

As seen in FIGS. 1 to 8 of the drawings, the elements which are designed for propulsion in a liquid medium comprise in all cases a magnetic element and a resilient flexible tail.

As seen in FIGS. 1a and 1b of the drawings, the magnetic element 1 (which in this example has a bore extending therethrough) is surrounded by a sleeve 2, the sleeve 2 being formed integrally with two projecting tails 3, each of arcuate cross-section.

In the element shown in FIGS. 2a and 2b, the element 1 is encased at one end of an elongated casing 4, the projecting portions of the casing being flattened to constitute a substantially planar centrally-projecting tail 5.

In the element shown in FIGS. 3a and 3b of the drawings, the element 1 is encased in a casing 6 the projecting portions of which diverge to form a pair of projecting tails 7.

In the element shown in FIGS. 4a and 4b, the element 1 is encased in a casing 8 which is shaped substantially to resemble a fish, while the element shown in FIGS. 5a and 5b has its element 1 imbedded in the end of a casing 9 which tapers uniformly in a streamlined fashion to a point.

In the element shown in FIGS. 6a and 6b, the element 1 is imbedded asymmetrically in an elongated casing 10, the two ends of which are flattened to provide tails 11 and 12 of differing lengths.

In the element shown in FIGS. 7a and 7b an element 13 has attached to it a flat tail-like fin 14.

In the case of all the elements illustrated in FIGS 1a to 7b of the drawings, the magnetic element is magnetized so that its poles are disposed at opposite longitudinal ends thereof. The application of a varying magnetic field directed across the longitudinal axis of the element results in the element performing motions in which the longitudinal axis of the element vibrates about a central position. These vibrations are transmitted to the tail which performs a flailing motion as a result of which the element is propelled forward.

By suitable choice of the intensity and frequency of the applied magnetic field in the case of the element shown in FIGS. 1a and 1b and 6a and 6b of the drawing, the direction of propulsion of the element can be determined.

Thus, with a magnetic field of 100 gauss and frequency of 50 c.p.s., an element as shown in FIGS. 1a and 1b is propelled in a direction from left to right while when the field is altered to 180 gauss while the frequency remains 50 c.p.s., the element is propelled in the reverse direction.

When, however, the intensity is maintained constant at 150 gauss, then with a frequency of 60 c.p.s., the element is propelled from left to right while when the frequency is raised to 80 c.p.s., the direction of propulsion is reversed. When the frequency is still further increased to 120 c.p.s., the direction of propulsion reverts to its initial direction. It should be noted that while the direction of propulsion is critically dependent on the frequency, the influence of the intensity is not so critical. The magnitudes given above are in connection with propulsion in water.

By arranging, however, for the magnetic element to be magnetized normally to its longitudinal axis, i.e. by transversely magnetizing the element, the poles can be respectively disposed in the upper and lower surfaces of the magnetic element and when such a magnetic element is located in a varying field directed along the axis of magnetization, the element, instead of undergoing vibrations undergoes rotational displacement. Thus, if such a magnetized element is included in an element as shown with reference to FIGS. 1a and 1b of the drawings, the rotational movement of the element induces in the projecting tail a displacement which results in the forward movement of the element.

FIGS. 8a and 8b of the drawings show a further example of an element which can be propelled as a result of rotational movement. In this case the element 15 is encased in a casing 16 which has associated with both ends thereof two spirally shaped flexible tails 17 and 18.

While there have been described various embodiments of elements which are propelled as a result of the vibratory or rotatory motion imparted to them by the applied varying magnetic fields, it is possible to combine in a compound element at least a pair of elements which are respectively vibrated and rotated by the applied field the composite element being propelled as a result of the combined motion thereby achieved.

It is also possible, by magnetizing the element about an axis which forms an acute angle with the longitudinal axis of the element to induce either rotational or vibrational movements or both in the element. The direction of propulsion can then be determined by the form of motion induced, the latter being a function of the intensity of the applied magnetic field.

Thus in a particular experiment which was carried out with an element as shown in FIGS. 1a and 1b of the drawings, when the body was subjected to an applied magnetic field of 50-60 gauss it advanced with a slight vibrational motion while when the intensity was increased to 120-140 gauss the element returned with a rotational motion. When the intensity was increased to 300 gauss the element again advanced, this time with very intense vibrational motion.

The element employed in this experiment included a magnetic element 2 mm. in diameter and 5 mm. in length and was magnetized at about 30° with respect to its longitudinal axis. The external diameter of the element was 3 mm. and its overall length was 13 mm. The experiments were carried out in a water filled tube using an alternating magnetic field of frequency 50 c.p.s.

An example of the application of the invention for the propulsion of elements in a liquid medium is shown in FIG. 9 of the drawings, which is a schematic representation of a toy aquarium wherein the toy fish are constructed as shown in FIGS. 4 and 5 of the drawings. As seen in this drawing, the aquarium comprises a tank 21 which is filled with water and which rests on a magnetic coil 22 which when energized with alternating current produces an alternating magnetic field which acts throughout the space in the tank 21. The tank 21 is filled with toy fish of the kind shown in FIGS. 4 and 5 of the drawings and upon application of the field the fish are propelled into motion. In view of the fact that no guidance is provided the motion of the fish is completely random and the effect is very similar to that in a real aquarium with real fish. It will, of course, be realized that a controlled directed motion can be imparted to the fish by the superimposition of a directing field on the alternating field or alternatively by locating the fish in narrow conduits or channels which define their motion. It must be borne in mind, however, when considering the question of guidance with unidirectional magnetic fields that such guidance is only effective with transversely magnetized elements where the basic motion of the magnetic element is vibrational.

As an example of the materials and field employed in the toy aquarium shown in FIG. 9 of the drawings, the following data is given:

A magnetic element formed of a platinum cobalt alloy, 1.2 mm. in diameter and 3 mm. in length, was fitted at one end of a silicone rubber sleeve 2 mm. external diameter and 15 mm. overall length, the projecting end of the sleeve being slotted to give the structure shown in FIG. 1 of the drawings. The magnetic coil was fed with an energizing current having a frequency of 50 c.p.s. and the intensity of the magnetic field designed to act on the "fish" could be varied between 50 and 600 gauss.

Apparatus in accordance with the invention particularly designed for diagnostic and therapeutic use in the cardio-vascular system will now be described with reference to FIGS. 10 and 11 of the drawings. As can be seen from FIG. 10, the apparatus comprises an upper and a lower plate structure 24 and 25 each plate comprising (as shown in FIG. 11 of the drawings) a central coil 26 through which can be passed, as required, alternating or direct current and which surrounds a central aperture 27. The central coil 26 is surrounded by four corner coils 28a and four side coils 28b through which can be passed unidirectional current. The upper and lower plate structures 24 and 25 are rigidly secured together by means of a framework 29 which incorporates X-ray shielding material and which allows the spacing of the plate structures to be varied. As can be seen in FIG. 10 of the drawings the installation is located above an X-ray table 30 so that X-rays can be directed from below through the aperture 27 in the lower plate structure 25 towards the aperture 27 in the upper plate structure 24 in which aperture a fluorescent screen of an X-ray installation can be located.

A patient resting on a stretcher 31 is interposed between the upper and lower plate structures 24 and 25, a suitable magnetic element such as for example a body as shown in FIGS. 1a and 1b of the drawings having previously been surgically introduced into the patient's cardio-vascular system. The position of the magnetic element (which is opaque to X-rays) is readily detectable on the X-ray screen and, by energizing the central coil 26 of one or both of the plate structures 24 and 25 with unidirectional current, a homogeneous field acts on the magnetic element keeping it in a fixed position. The desired direction of advance of the element having been decided by the operator, the suitable D.C. coils are actuated so as to ensure that the element points in the required direction. Thereupon, alternating current is used to energize the central coil 26 and under the influence of the alternating field the element advances in the required direction. At any stage when it is desired to halt the advance of the element the current supply to the central coil 26 is switched from A.C. to D.C. It will be understood that, with normal fluoroscope technique the position and movement of the magnetic element can be observed but not the particular ducts such as the arteries through which the element moves. For this purpose, it is not considered necessary to provide an arteriogram of the patient's cardio-vascular system since it is believed that this system remains substantially standard in size from patient to patient. Thus the experienced operator will know substantially accurately at any stage at which position of the system the element is located and it will therefore be possible for him to guide the element to a required location.

When the element has reached the required location it can be actuated from outside to perform a required action such as, for example, the release of drug, duct dilation or cutting, etc.

Another possible use for such an element which has been introduced into the system and advanced to the required location by the apparatus just described, or by similar apparatus, is in measuring the rate of flow of blood through the duct in which the element is located. For this purpose, the element is constructed so as to have a specific gravity substantially equal to that of the blood in which it is to flow and so as to constitute a minimum obstruction to the flow of the blood. The element is advanced to the required location as described above and is held in position by the energizing of the central coils by means of a direct current. With the element held in this position, it is observed on the fluoroescent screen and a series of timed photographic exposures are taken of the progress of the element through the duct, the exposures starting directly upon de-energizing of the central coils and consequent release of the element to flow with the blood.

Analogous use of such an element is in measuring, for example, the width of an artery in which it is located. Thus, after the element has been introduced into the system and has been advanced to the required location where measurement takes place by means described above, a homogeneous unidirectional field can act on the element causing it to move to one side of the artery. In this position an X-ray photograph is taken and the direction of the homogeneous field is reversed and the element moves to the other side of the artery and a subsequent X-ray photograph is taken. The distance between the two external edges of the element as shown in the photographs gives the internal diameter of the artery.

In one example of apparatus which has been developed as a prototype in accordance with FIGS. 10 and 11, the following characteristic measurements and values were employed:

| | |
|---|---|
| Central coil 26 sectional area _____sq. mm__ | 2 |
| No. of turns _____ | 700 |
| Applied alternating voltage _____ volts__ | 110, 220, 380 |
| Applied direct voltage _____volts__ | 24, 48 |
| Lateral coils 28, sectional area _____sq. mm__ | 1.4 |
| No. of turns _____ | 800 |
| Applied direct voltage _____volts__ | 24, 48 |

Reference will now be made to FIGS. 12 to 15b of the drawings wherein is illustrated apparatus for examining and treating the arterial system of the brain. As seen in FIG. 12 of the drawings the apparatus comprises a rigid box-like framework 32 having disposed at its corners electric coils 33 to 40 which, when energized with unidirectional current produce homogeneous unidirectional fields in the space defined within the box-like framework and which can, if required, be energized with alternating current. The framework 32 is surmounted by a centrally disposed coil 41 to be energized by alternating current and is furthermore provided with means (not shown) whereby a patient's head can be held in a fixed position during the carrying out of the diagnosis and therapy.

The method of carrying out a diagnostic and/or therapeutic operation with the apparatus will now be described with reference to FIGS. 13 and 14 of the drawings. The patient's head is secured in the apparatus by the securing means previously referred to in a fixed position with respect to certain median reference lines (not shown).

With the head in the position shown in the drawings, front and lateral arteriograms 42 and 43 (see FIGS. 15a and 15b) are taken on which the reference lines previously referred to appear. The developed films 42 and 43 are placed in front of front and lateral fluorescent screens 44 and 45 located as shown in FIG. 14 of the drawings. A magnetically propelled element is then introduced into the patient's carotid artery, and on irradiating the patient's head from a front or lateral direction the position of the magnetic element can be directly observed on the fluorescent screens and this position is directly superimposed upon the arteriograms which have been mounted in position.

In order now to ensure the advance of the magnetic element in a required direction the body must first of all be guided by the assembly of D.C. operated coils 33 to 40 so as to point in the required direction. The actuation of the particular coils so as to ensure this guidance is effected using the front and lateral switch assemblies 46 and 47. Thus, as seen in FIG. 15a of the drawings, when it is desired that the element should be directed in the direction of the arrow 48, the pointer of the switch 46 is directed in the same direction thereby putting into circuit the coils 2, 6 and 3, 7. Viewing the patient and the magnetic element laterally, it will be seen that from a lateral point of view as shown in FIG. 15b of the drawings the element has to be directed along the direction of the arrow 49. The pointer of the lateral switch assembly 47 therefore is turned so as to be directed accordingly thereby putting into circuit the coils 1, 2 and 8, 7.

Each of the coils is connected to a switching contact of a switch assembly and the switch assemblies are connected in series. In consequence therefore the only coils that are effectively put into circuit are the coils 2 and 7 thereby ensuring that the element is given the required direction. In the particular situation where, as a result of a unique orientation of the element, the latter only appears as a point on one of the X-ray screens then the front and rear series of coils (when viewed from that screen) are actuated so as to displace the element until it comes into full view.

With the magnetic element properly directed the element can be advanced to the required position by energizing the upper coil 9 with alternating current. Subsequent redirection of the element is ensured by de-energizing the upper coil and repeating the operation described above in connection with the D.C. operated coils.

While in the two examples of the apparatus described above the actual propulsion of the element has been effected under the influence of a varying field it will be realized that, in suitable cases, particularly where the path the element is to follow is relatively linear propulsion can be under the influence of a unidirectional field gradient.

Furthermore, while in the two examples given above the guidance of the element has been effected as a result of manual switching of the homogeneous fields by the operator it will be realized that, in the case where the element is to follow a tortuous path particularly where this path is subject to considerable branching and/or changes of direction, it is very cumbersome and time-consuming to effect the guidance by manual switching. It should particularly be borne in mind that the speed of switching is often of considerable importance in view of the fact that the element is subject to the influence of the flow of the bloodstream itself. It is therefore proposed to determine the required nature of the switching by means of a computer to which the necessary information is fed and to ensure that the switching itself takes place electronically. For this purpose the following procedure is suggested, as illustrated in FIGS. 16–19 of the drawings. As described above and shown in FIG. 16 front and lateral arteriograms 42 and 43 are taken. The desired paths 50 and 51 to be taken by the element are drawn in ink on transparent sheets 52 and 53 which are respectively superimposed on the arteriograms. The sheets 52 and 53 are monitored by graphic transducers 54 and 55 of a computer 56 where the coordinates of the path as represented by the magnetic ink are converted into numerical or digital form for each of the two X-ray pictures. The computer thereupon computes the three-dimensional coordinates to be taken by the device from the coordinates given in each of the two pictures and also computes the magnetic fields which are required to guide the device along this path. The results of the entire computation are recorded via a recorder 57 on magnetic tape 58 which is then available to the operator carrying out the diagnosis or therapy with the apparatus who uses it as schematically shown in FIG. 19 of the drawings. Thus, the information on the tape is reproduced in a reproducer 59, the reproduced signal being amplified in an amplifier 60 and the amplified signals being fed to the coils so as to guide and propel the element. A manual control mechanism 62 is also provided for effecting manual control if required. Of course, the operator will continue to follow the progress of the element on the fluorescent screen of the X-ray device and can immediately correct the motion of the element with the manual control 62 if, by chance, it chooses a wrong path or becomes stuck.

In all the specific examples described above, the propulsion of an element in a liquid medium has been considered, wherein the actual propulsion of an element arises out of the viscosity or internal resistance of the fluid medium and the radially asymmetrical shape of the element. The further case has now to be considered where the element is propelled under the influence of a varying magnetic field and in contact with a rigid or semi-rigid medium, the propulsion possibly taking place in the dry state.

Reference will now be made to FIGS. 20a, 20b and 20c of the drawings, wherein as can be seen, a magnetic element 65 which is located in a tube 66 consists of a magnetic element having a rounded wider end 67 and a sharp-cornered narrower end 68. The poles of the magnetic element are respectively located at the opposite longitudinal ends of the element. It is desired to propel the element 65 along the conduit 66 in the direction of the arrow 69 and for this purpose an alternating magnetic field is applied to the conduit in a direction transverse thereto.

FIG. 20a of the drawings shows the position of the element 65 before the application of the alternating magnetic field.

FIG. 20b shows the displacement of the element 65 upon the initial application of the field, the field being directed as shown by the arrow 70. The element 65 tilts as shown in FIG. 20b of the drawings and, by virtue of the fact that the length of the element 65 is somewhat greater than the diameter of the conduit 66, the element 41 becomes wedged slant-wise in the conduit 66 as shown. When now the direction of the field is reversed as shown in FIG. 20c of the drawings so as to be directed in the direction of the arrow 71 the element 65 tilts upwardly until it becomes wedged in the position shown in FIG. 20c. By virtue of the fact that the end 68 of the element 65 is sharply terminated while the forward end 67 is rounded this successive tilting of the element 65 results in an overall forward movement thereof consequent upon the sliding of the element 65 where it contacts the walls of the conduit 66 with its rounded smooth edge 67.

In FIG. 21 is shown a further example of an element capable of propulsion by virtue of repeated frictional impacts with the walls of a surrounding tube. In this case the element comprises a magnetic element 72 which is encased at one end of a plastic sleeve 73.

The element shown in FIG. 22 comprises a magnetic element 74 having its poles disposed at opposite ends of its longitudinal axis and having secured thereto a plurality of semi-rigid wires 75 each of which is formed with a series of gripping teeth 76. In the case of this element the forward propulsion takes place in a manner analogous to the propulsion of the element 65 as described with reference to FIGS. 20a, 20b and 20c of the drawings. Thus in one direction of tilting the teeth 76 engage with the walls of the conduit thereby ensuring that when the magnetic field is reversed the reversed tilting of the body is accompanied by a forward slipping or gliding of the body.

FIGS. 23a, 23b and 23c show the propulsion of a compound body 77 which comprises a pair of magnetic elements 78 and 79 coupled together by a flexible link 80 the bodies being magnetized about their longitudinal axes in such a direction that like poles of the two elements 78 and 79 are disposed opposite each other. The elements 78 and 79 are respectively associated with sets of semi-rigid wires 81 and 82 which in the position shown in FIG. 23a of the drawings prior to the application of an alternating magnetic field transverse to the direction of the conduit 83 bear uniformly on the inner walls of the conduit.

As seen in FIG. 23b of the drawings upon the application of a magnetic field which is initially along the direction shown by the arrow 84 the elements 78 and 79 tilt in opposite directions owing to their opposite directions of magnetization and as a result the upper sets of wires 81, 82 come together while the lower sets of wires 81, 82 remain splayed apart. Upon reversal of the field as shown in FIG. 23c of the drawings into a direction indicated by the arrow 85 the situation is reversed and as a result of the reversal of the direction of tilting of the two elements 78 and 79 and the coming together of the lower sets of wires 81 and 82 and the splaying apart of the upper sets of wires 81 and 82, this tilting of the elements 78 and 79 is accompanied by a forward gliding motion.

In the case of the embodiments shown in FIGS. 20a to 23c of the drawings the magnetization of the magnetic elements is such that the poles of the elements are located at opposite longitudinal ends of the elements and in consequence the motion imparted to the elements by the transversely directed varying magnetic fields is a vibrational motion.

In the embodiment shown in FIG. 24 of the drawings, however, a cylindrical magnetic element 86 is magnetized in a direction transverse to its longitudinal axis and this element is associated with a spiral screw structure 87 wound round the element 86. Upon the application of a transversely directed magnetic field to the element shown in FIG. 22, a rotational motion is induced in the element 65 and, when the screw structure 87 is in contact with a supporting surface having a fixed abutment or is in liquid, the rotation of the entire element results in a forward motion thereof.

While in the specific embodiments of magnetically propelled elements described above, the design of the elements is such as to allow for their propulsion either in dry or in wet conditions an element can be designed which can combine the features required for propulsion in both media. For example, the body shown in FIGS. 1a and 1b of the drawings which is propelled in a liquid medium as a result of the flailing action induced in its tail 3 can be associated with toothed wires of the kind shown in FIG. 22 of the drawings by means of which the element can be propelled in a conduit by repeated contact with the walls thereof. Furthermore, the possibility exists of introducing a plurality of separate bodies into a system such as an arterial system of a patient and causing the elements to come together at a desired location where they can be effectively combined to perform a required operation.

As indicated above, one of the preferred applications of the invention is in the guidance of an element to a suitable location in the arterial system of a patient at which location the element may be required to undertake certain operations which are actuated from outside. The presence of the body in the patient's system requires that it be made of a material which is substantially chemically inert so as not to react with the substances in the blood, the walls of the ducts through which it passes or any of the other substances with which it comes into contact. Another requirement, of course, is that the magnetic component of the element should be constituted by a strong permanent magnet of a high enough remanence to give rise to a strong force in the applied magnetic field and of high enough coercive force not to be demagnetized by the applied magnetic field. Preferably the magnetic material should have a coercive force of not less than 750 oersteds. Suitable materials include Barium Ferrite, Ticonal Alnico 8 and an alloy consisting of about 50% cobalt and 50% platinum. The material should also have the property of being strongly absorptive to X-rays so as to be capable of ready detection. The non-magnetic portions of the element such as the flexible tail can be formed of latex or silicone rubber.

The element must, however, furthermore be constructed as to be capable of undertaking the tasks required of it on being actuated from without. Such an element which is capable upon actuation of releasing a drug will now be described with reference to FIG. 25 of the drawings.

As seen in this figure, the element comprises a cylindrical cup 91 formed of a platinum-cobalt alloy in which cup is located the required drug 92. The cup is sealed by means of a disk-like cover 93 through which passes a rod-like member 94 having a lower extended portion 95 and an upper flanged portion 96 the latter resting on the upper surface of the cover member 93. The upper half 94a of the rod 94, is formed of the same platinum-cobalt alloy as is the cup 91 while the lower half 94b of the rod 94 is formed of a non-magnetic material. The cover 93 is formed of a magnetic material such as a known copper-nickel alloy having a Curie-point of about 40° C. The cover member 93 and cup 91 are magnetized in such a manner that when the ambient temperature is below the Curie temperature the cover member 93 is attracted to the cup 91 thereby closing the cup. When, however, the ambient temperature rises above the Curie temperature the cover member 93 becomes non-magnetic and in view of the fact that the rod portion 94a is magnetized in such a manner as to be repelled by the cup 91 the cover 93 is forced away from the cup 91 under the repulsive force exerted between the cup 91 and the rod 94a and as a result the cup is opened leading to the ejection of the drug. When the temperature is again reduced below the Curie temperature of the cover 93, the cover is attracted towards the cup 91 closing it.

Thus, it can be seen that when the element as described with reference to FIG. 25 and which is associated, for example, with a resilient tail as described above with reference to FIGS. 1a to 8b of the drawings, is brought to the required position where the drug is to be released, the release of the drug can be effected by imparting to the body a high frequency impulse sufficient to raise the temperature of the element above the Curie temperature of the cover member. The consequent opening of the element results in release of the drug. It will, of course, be realized that the element formed as it is of a suitable magnetic alloy is itself directly responsive to the effects of an applied varying magnetic field so as to result in its propulsion to the desired location.

We claim:

1. Diagnostic and/or therapeutic apparatus for the detection and longitudinal propulsion of an elongated, radially asymmetric element through the ducts of an animal or human patient, said ducts exhibiting a frictional resistance to longitudinal movement of the element therethrough, which comprises the asymmetric element having no center of symmetry, a magnetic element constituting at least a portion of said element, magnetic field means for producing a varying magnetic field imparting a vibrational or rotational motion to said element, and actuating means on said element which, upon vibration or rotation of the asymmetric element, coacts with the frictional retarding force imparted to the element by said ducts to produce longitudinal movement of the element through the ducts in opposition to said retarding force.

2. Diagnostic and/or therapeutic apparatus for the detection and propulsion of an elongated, radially asymmetric element through the ducts of an animal or human patient, said ducts exhibiting a frictional resistance to longitudinal movement of the element therethrough, which comprises:
   (a) the asymmetric element having no center of symmetry;
   (b) a magnetic element constituting at least a portion of said element;
   (c) first magnetic field means for producing a varying magnetic field imparting a vibrational or rotational motion to said element, said means including at least one electromagnetic coil to be placed adjacent to the portion of the patient in which said element is disposed;
   (d) further magnetic field means for producing one or more unidirectional magnetic biasing fields acting on said element to guide the movement thereof, said further means including a plurality of additional electromagnetic coils to be placed symmetrically of the portion of the patient in which said element is disposed;
   (e) actuating means on said element which, upon vibration or rotation of the asymmetric element, coact with the frictional retarding force imparted to the element by said ducts to produce movement of the element through the ducts in opposition to said retarding force; and
   (f) switching means for independently actuating the electromagnetic coils of said first and said further magnetic field means.

3. Apparatus according to claim 2, wherein the respective magnetic field means comprise a pair of plate structures, each of which includes a central electromagnetic coil and a plurality of side coils; and including means for connecting said plate structures to one another in alignment with and variably spaced from one another to permit the introduction of a patient therebetween, the central coils of said two plate structures, respectively, defining aligned central apertures through which X-rays can be directed.

4. Apparatus according to claim 2, including a box-like framework for surrounding the head of the patient, the electromagnetic coil of said first magnetic field means surmounting said framework and the electromagnetic coils of said further magnetic field means being mounted on said framework symmetrically of the patient's head.

5. An elongated radially asymmetric element suitable for longitudinal propulsion through the ducts of an animal or human patient, said ducts exhibiting frictional resistance to movement of the element therethrough; said element being constituted of a chemically inert material which does not react with animal or human blood or tissue and which is so shaped as not to have any center of symmetry, the radially asymmetric element comprising a magnetic portion having high remanence and a high coercive strength and being strongly absorptive of X-rays so as to be capable of ready detection thereby, and actuating means for coacting with the frictional retarding force imparted to the element by said ducts, upon vibration or rotation of the element within the ducts, to produce longitudinal movement of the element therethrough in opposition to said frictional resistance.

6. The element according to claim 5, wherein said magnetic element has a coercive strength of not less than 750 oersteds.

7. The element according to claim 5, wherein said magnetic element is magnetized substantially longitudinally with respect to the desired direction of propulsion of the asymmetric element.

8. The element according to claim 5, wherein said magnetic element is magnetized substantially transversely with respect to the desired direction of propulsion thereof.

9. The element according to claim 5, wherein said actuating means comprises at least one flexible tail.

10. The element according to claim 5, which includes a pair of magnetic elements, each of which is magnetized both longitudinally and transversely thereof.

11. A method for the detection and longitudinal propulsion of an elongated, radially asymmetric magnetic element having no center of symmetry through the ducts of an animal or human patient, said ducts exhibiting a frictional resistance to longitudinal movement of the element therethrough, which comprises impressing a varying magnetic field on said element to impart a vibrational or rotational motion thereto, the vibration or rotation of the asymmetric element coacting with the frictional retarding force imparted to the element by said ducts to produce longitudinal movement of the element through the ducts in opposition to said retarding force.

12. A method for the detection and propulsion of an elongated, radially asymmetric magnetic element having no center of symmetry through the ducts of an animal or human patient, said ducts exhibiting a frictional resistance to longitudinal movement of the element therethrough, which comprises impressing a first varying magnetic field on said element to impart a vibrational or rotational motion thereto, impressing at least one further unidirectional magnetic biasing field on said element to impart a corresponding unidirectional longitudinal motion thereto, said first and biasing magnetic fields being independently impressed on said asymmetric element in order that the vibration or rotation of the element produced by said first magnetic field and the longitudinal motion produced by said biasing field coacts with the frictional retarding force produced in the patient's ducts to produce the desired directed longitudinal propulsion of the element through said ducts.

References Cited

UNITED STATES PATENTS 3,057,344  9/1962  Abella et al. _____ 128—2

FOREIGN PATENTS 281,869  2/1915  Germany.
592,479  5/1959  Italy.

RICHARD A. GAUDET, *Primary Examiner.*

SIMON BRODER, *Examiner.*